United States Patent [19]
Johnson et al.

[11] 3,818,235
[45] June 18, 1974

[54] METHOD AND CIRCUIT FOR PROVIDING AN OPTICALLY COUPLED LINEAR ISOLATOR

[75] Inventors: Delbert L. Johnson; Kenneth B. Muehleman, both of San Diego, Calif.

[73] Assignee: Delbert L. Johnson, San Diego, Calif.

[22] Filed: Aug. 21, 1972

[21] Appl. No.: 282,380

[52] U.S. Cl................. 250/551, 250/205, 307/311
[51] Int. Cl............................................. G02f 1/28
[58] Field of Search.......... 250/209, 217 SS, 217 S, 250/551, 205; 307/89, 311

[56] References Cited
UNITED STATES PATENTS

| | | | |
|---|---|---|---|
| 3,399,348 | 8/1968 | Praglin et al. | 250/217 S |
| 3,480,780 | 11/1969 | List et al. | 250/209 |
| 3,708,672 | 1/1973 | Marinkovic | 250/217 S |
| 3,772,514 | 11/1973 | Sunderland | 250/551 |

Primary Examiner—Walter Stolwein
Attorney, Agent, or Firm—Brown & Martin

[57] ABSTRACT

A method and circuit for transmission of an electrical signal from one circuit to another with there being no electrical connection therebetween, such as from a battery source circuit to a ground oriented, electrical power line circuit through an isolator circuit, in which the transmission is by modulating an emitter of light radiation in one of two identical light radiation circuits. The other light radiation circuit aligns its voltage to the first light radiation circuit through an error signal, whereby the output signal is held to the same voltage as the input signal.

12 Claims, 1 Drawing Figure

3,818,235
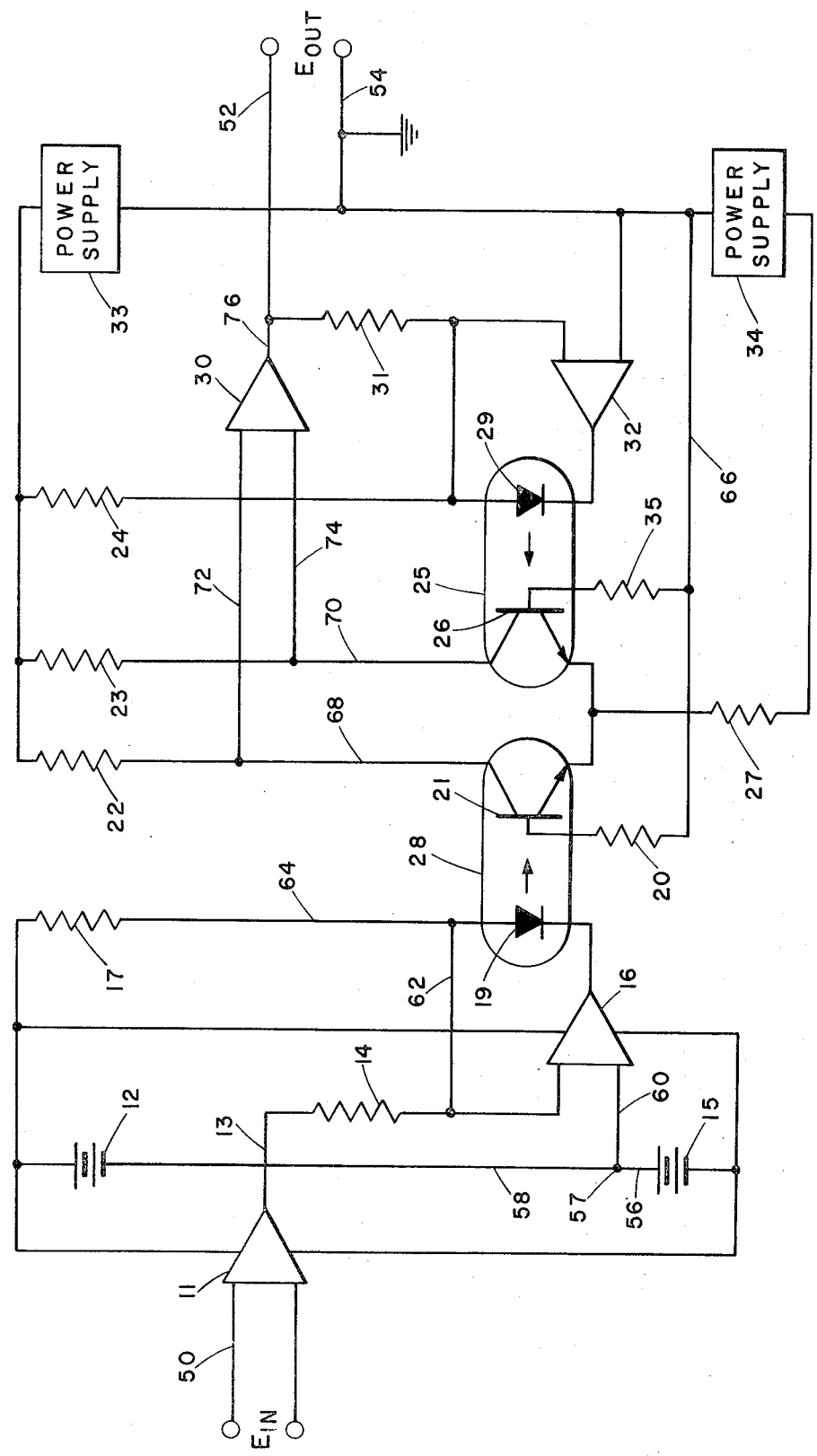

METHOD AND CIRCUIT FOR PROVIDING AN OPTICALLY COUPLED LINEAR ISOLATOR

BACKGROUND OF THE INVENTION

There are many requirements for optically coupled isolators. A particular application is in electrocardiography, where skin potentials of a person are measured by an electrocardiograph. The patient is directly connected to wires that provide an output of the detected voltages. These voltages must then be fed to an electrocardiograph device. However the electrocardiograph device is normally powered from a normal AC power line. So any failure could conceivably apply AC power in possibly lethal amounts through the patient connections. Since such currents are often in the range of 10 mico amperes, even minor equipment failures in such devices are potentially dangerous to the patient.

So it is of advantage to have an electrical detection system for detecting the skin potentials and transforming the skin potentials to a recorder, storage or display device, that is operated from an AC power line while maintaining complete electrical isolation between the input battery powered circuit and the output voltage supply that is referenced to earth ground. Further it is of advantage to have a system for accomplishing this isolation utilizing a linear portion of the transfer function of the responsive circuit elements, so the represented signal out is linearly related to the signal in.

SUMMARY OF THE INVENTION

In an exemplary embodiment of this invention, an input circuit provides an electrical signal of interest to a resistor and amplifier circuit that is powered by isolated battery power to a first light generating means. The light generating means transmits a proportional signal of light radiation to a first light responsive means. The light generating means and the light responsive means are isolated from each other electrically. A second light generating means and second light responsive means are connected into circuit means fo providing an output voltage that is proportional to the input voltage across the resistor. The outputs of the first and second light responsive means are electrically detected to provide an error signal reflective of the differences in the electrical signal output. This error signal is fed through a resistor to an amplifier that is powered by power from a normal power line. The output of the amplifier is fed to the second light generating means. The error signal drives the second light generating means to cause the outputs of the first and second light responsive means to be electrically the same. When this occurs, the voltage across the second resistor is the same as that across the first resistor and the electrical output of the circuit that is isolated from the input circuit is equal to the electrical signal to the input circuit. The respective light generating means are normally light emitting diodes and the light responsive means are light responsive transistors. The amplifiers drive the signals to a linear portion of the transfer characteristics of the light emitting diodes to improve the linearity of the transmitted signal across the electrical isolation. So any opening of these circuits in the power line portion will not have any effect on the electrically isolated input circuit that is battery powered, yet the transmission of the signal is optically coupled in a linear response isolator mode.

It is therefore an object of this invention to provide a new and improved optically coupled linear isolator.

It is another object of this invention to provide a new and improved optically coupled linear isolator that has a degree of isolation that is exceptional, being limited only by the characteristics of the particular optical coupling device used.

It is another object of this invention to provide a new and improved optically coupled linear isolator having improved linearity of transmission.

It is another object of this invention to provide a new and improved optically coupled linear isolator capable of providing compensation for nonlinearity and drift effects of components used.

It is another object of this invention to provide a new and improved method of providing optically coupled linear transfer of signals in an isolated circuit arrangement.

Other objects and many advantages of this invention will become more apparent upon a reading of the following detailed description and an examination of the drawing wherein like reference characters designate like parts throughout and in which:

The single FIGURE in the drawing is a block diagram of an embodiment of the invention.

Referring now to the drawing, an electrical input signal $E_{in}$, is supplied through input lines 50 to amplifier 11. This input signal may comprise any signal of interest from any suitable source, of which it is desired to isolate from the output signal, $E_{out}$, in lines 52 and 54. Amplifier 11 supplies a current through line 13 and resistor 14 that is proportional to the voltage $E_{in}$. Amplifier 16 is used in a conventional, operational amplifier configuration with light-emitting diode 19 in its feedback circuit. The other side of the amplifier 16 is connected by lines 56, 58 and 60 to the junction 57 of DC sources 12 and 15, which power supplies are isolated from ground. The other side of the light emitting diode or light generating means 19 is connected through line 62 in the feedback circuit to the amplifier 16 and through line 64 and resistor 17 to the DC source 12. Resistor 17 functions to establish the operating point of the light-emitting diode 19 on its transfer characteristic.

Because of the operational configuration, the two input terminals of amplifier 16 are at virtually idential potentials, so the voltage across resistor 14 is identical to the voltage from line 60 to the junction 57 of the DC sources 12 and 15. As will be more apparent hereinafter, the voltage across resistor 31 is virtually identical to $E_{out}$ for the same reasons.

Amplifier 11 is ideal, so the voltage of line 13 is a faithful representation of the voltage $E_{in}$. Amplifier 16 has a very high gain, so the current through the light emitting diode 19, or the first light generating means, is linearly related to the voltage of line 13 or across resistor 14. In the method and circuit of this invention, diode 19 operates over a very small dynamic range and this contributes materially to the linearity of the transmission. The transmission is direct-coupled; that is, frequency response begins at DC and extends to an upper limit set by the characteristics of the optical coupling device.

The optical coupling device comprises the light emitting diode 19 and a first light responsive means or transistor 21, enclosed in an isolated coupling housing 28.

The second light generating means or light emitting diode 29 and the second light responsive means or transistor 26 in housing 25 are identical to that in housing 28. Such isolated coupling devices are known, being typified by the MCT2 and MCA2-30 devices made by Monsanto Corporation and the ISO-LIT1 device made by Litronix Corporation.

The light radiation generated by the light emitting diode 19 strikes the base region of transistor 21 and modulates its collector current. The emitter of transistor 21 is connected to the emitter of transistor 26, which is a part of the optically coupled pair 25. The common emitters are supplied with a constant current by resistor 27 from power supply 34. The power supply 34, as well as power supply 33, are normal line connected power supplies, such as an AC power supply that generally has a reference to earth ground. However other suitable power supplies may be used. The connection of two similar transistors 21 and 26 provides the advantages of a conventional differential amplifier, that provides low temperature drift and long term stability.

The base currents for transistors 21 and 26 are supplied by resistors 20 and 35 through line 66 from the junction of power supply 33 and 34. When the collector currents are unequal, the voltage drops in lines 68 and 70 across equal resistors 22 and 23, are also unequal. Amplifier 30 detects this difference through connecting lines 72 and 74 and amplifies the difference in its output to line 76. So amplifier 30 provides a current through resistor 31 that is proportional to the difference in voltages across resistors 22 and 23. Amplifier 32 is connected in an operational configuration that is identical to that of amplifier 16, and the radiation from light emitting diode 29 is proportional to the current through resistor 31 and therefore, to the differences in voltages across resistors 22 and 23. Resistor 24 is used to set the quiescent operating point of diode 29. The feedback loop, including amplifiers 30 and 32 and the optically coupled pair 25, operates to null the input to amplifier 30; that is, the difference in voltage across resistors 22 and 23 is different from zero by small error increment that can be set by the selection of loop gain. The current through resistor 31 that is necessary to maintain this stable loop condition is such that the voltage across resistor 31 duplicates that across resistor 14.

Amplifiers 30 and 32 are biased by power supplies 33 and 34 by electrical connections (not shown). So all the circuitry between transistor 21 and $E_{out}$ is connected to power supplies 33 and 34. All circuitry between $E_{in}$ and diode 19 is connected only to DC sources 12 and 15 and is electrically isolated from earth ground or any other electrical connection.

While the preferred embodiment has been described as a unity-gain, isolated, coupling device, it should be recognized that the voltage across resistor 31 can be set relative to the voltage across resistor 14 by a constant multiplier greater than 1. So gain can be realized in this isolation circuit without compromising the isolation of the two circuits.

Having described our invention, we now claim:

1. An optically coupled linear isolator comprising, first and second light generating means responsive to electrical signals for transmitting proportional signals of light radiation,
first and second light responsive means being electrically isolated from respective ones of said light generating means and responsive to said light radiation signals for providing proportional electrical signal outputs,
said first and second light responsive means being electrically coupled,
detector means fo detecting differences in electrical signal outputs of said first and second light responsive means and providing an output difference signal,
circuit means for providing an output voltage proportional to the electrical signals applied to said second light generating means,
and said circuit means including means for impressing said difference signal across said second light generating means balancing said electrical signal outputs of said light responsive means and making said output voltage proportional to the electrical signals applied to said first light generating means.

2. An optically coupled linear isolator as claimed in claim 1 in which,
said first and second light responsive means having a response characteristic that is linear over a portion thereof,
and means for applying electrical signals to said light generating means in said linear characteristic portion.

3. An optically coupled linear isolator as claimed in claim 2 in which,
said first and second light generating means comprising light emitting diodes.

4. An optically coupled linear isolator as claimed in claim 3 in which,
said first and second light responsive means comprising light responsive transistors.

5. An optically coupled linear isolator as claimed in claim 4 in which,
said first light emitting diode and said first light responsive transistor and said second light emitting diode and said second light emitting transistor being respectively grouped in electrically isolated housings.

6. An optically coupled linear isolator comprising:
first and second light generating means responsive to electrical signals for transmitting proportional signals of light radiation,
first and second light responsive means being electrically isolated from respective ones of said light generating means and responsive to said light radiation signals for providing proportional electrical signal outputs,
said first and second light responsive means being electrically coupled,
detector means for detecting differences in electrical signal outputs of said first and second light responsive means and providing an output difference signal,
circuit means for providing an output voltage proportional to the electrical signals applied to said second light generating means,
said circuit means including means for impressing said difference signal across said second light generating means balancing said electrical signal outputs of said light responsive means and making said output voltage proportional to the electrical signals applied to said first light generating means, an input electrical signal being fed through a first resistor to an amplifier which amplifier is connected to a source of battery power, and said amplifier feeding the amplified electrical signal to said first light generating means which is a light emitting diode, whereby the current applied to said first light emitting diode is the same current as the current through said resistor.

7. An optically coupled linear isolator as claimed in claim 6 in which, said detector means comprises an amplifier that is responsive to the outputs of each of said first and second light responsive means, which comprise light responsive transistors, a second resistor connected to the output of said amplifier for feeding a voltage to a third amplifier, said third amplifier being powered by a power supply reference to earth ground, said third amplifier feeding a signal to said second light generating means, which comprises a second light emitting diode, said output of said second light emitting diode being optically and electrically connected to the input of said amplifier, whereby the current through said second resistor is the current through said second light emitting diode, and when said output of said first and second light responsive means are equal, then the voltage drop across said first and second resistors are equal.

8. An optically coupled linear isolator as claimed in claim 7 in which, said output voltage comprising the voltage across said output power supply and the output of said second amplifier means.

9. The method of coupling an isolated input signal to an output signal comprising the steps of, feeding an input signal to a light responsive diode, directing the light radiation of said light emitting diode to an electrically isolated light responsive transistor, electrically connecting the outputs of said light responsive transistor to a second light responsive transistor, sensing the difference between the output signals of said transistors providing an error signal, applying said error signal to a second light emitting diode whose light radiations are directed onto said second light responsive transistor, whereby the current through said second light emitting diode is proportional to the current through said first light emitting diode, and providing an output voltage proportional to said current through said second light emitting diode.

10. The method as claimed in claim 9 including the step of, driving said signals applied to said first and second light emitting diodes to the linear response portion of said light emitting diodes.

11. The method of coupling an isolated input signal to an output signal comprising the steps of, feeding an input signal to a light responsive diode, directing the light radiation of said light emitting diode to an electrically isolated light responsive transistor, electrically connecting the outputs of said light responsive transistor to a second light responsive transistor, sensing the difference between the output signals of said transistors providing an error signal, applying said error signal to a second light emitting diode whose light radiations are directed onto said second light responsive transistor, whereby the current through said second light emitting diode is proportional to the current through said first light emitting diode, providing an output voltage proportional to said current through said second light emitting diode, feeding the input signal applied to said light emitting diode through a resistor to the input of an amplifier, with the output of the amplifier being applied to the light emitting diode, and providing a power supply to the other input of the amplifier from a battery power source.

12. The method as claimed in claim 11 including the steps of, feeding the error signal through a resistance to the input of a second amplifier which amplifies the signal and applies the signal to the second light emitting diode, the other side of said second amplifier being supplied from power sources that have an electrically ground earth reference, and setting said system whereby the drops across said respective resistors are equal when said error signal is at zero voltage.

* * * * *